United States Patent
Kasai

(10) Patent No.: US 7,418,121 B2
(45) Date of Patent: Aug. 26, 2008

(54) MEDICAL IMAGE PROCESSING APPARATUS AND MEDICAL IMAGE PROCESSING SYSTEM

(75) Inventor: Satoshi Kasai, Hachioji (JP)

(73) Assignee: Konica Minolta Medical & Graphic Inc., Tokyo (JP)

( * ) Notice: Subject to any disclaimer, the term of this patent is extended or adjusted under 35 U.S.C. 154(b) by 663 days.

(21) Appl. No.: 11/008,880

(22) Filed: Dec. 10, 2004

(65) Prior Publication Data

US 2005/0152592 A1 Jul. 14, 2005

(30) Foreign Application Priority Data

Dec. 25, 2003 (JP) .............................. 2003-431249

(51) Int. Cl.
*G06K 9/00* (2006.01)
(52) U.S. Cl. ..................... 382/128; 382/224; 378/29
(58) Field of Classification Search ................ 382/100, 382/128, 129, 130, 131–133, 155, 168, 178, 382/181, 189, 199, 203, 224, 232, 256, 274, 382/276, 286–291, 295, 305, 170; 600/425; 378/14, 20, 21, 25, 29
See application file for complete search history.

(56) References Cited

U.S. PATENT DOCUMENTS

| | | | | |
|---|---|---|---|---|
| 5,807,256 A * | 9/1998 | Taguchi et al. | .............. | 600/425 |
| 6,934,409 B2 * | 8/2005 | Ohara | ......................... | 382/132 |
| 7,242,795 B2 * | 7/2007 | Takeo et al. | ................. | 382/132 |
| 7,245,754 B2 * | 7/2007 | Goto | ........................... | 382/128 |
| 7,248,728 B2 * | 7/2007 | Takeo | .......................... | 382/132 |
| 7,298,878 B2 * | 11/2007 | Goto | ........................... | 382/128 |

FOREIGN PATENT DOCUMENTS

JP    2002-112986 A    4/2002

\* cited by examiner

*Primary Examiner*—Seyed Azarian
(74) *Attorney, Agent, or Firm*—Frishauf, Holtz, Goodman & Chick, P.C.

(57) ABSTRACT

A medical image processing apparatus includes: an abnormal shadow candidate detecting section for detecting an abnormal shadow candidate from a medical image in which a subject image is generated, with a judging logic which performs judgment with training data; a training data storing section for storing the training data used at a detection of the abnormal shadow candidate, so as to make the training data updatable; a displaying section for displaying the medical image and a detection result; an area designating section for designating an area to be registered as the training data on the medical image displayed on the displaying section; a data controlling section for having an image of the designated area stored in the training data storing section; and a logic correcting section for correcting the judging logic of the abnormal shadow candidate detecting section, based on the training data stored in the training data storing section.

15 Claims, 13 Drawing Sheets

□ : ABNORMAL CASE CLASS
○ : NORMAL CASE CLASS
▨ , ◉ : SUPPORT VECTOR OF EACH CLASS

FIG.5

| USER | AFFILIATED DEPARTMENT | LESION TYPE | CLASSIFICATION CATEGORY | TRAINING DATA |
|---|---|---|---|---|
| DOCTOR X | INTERNAL MEDICINE | MASS | NORMAL CASE | TRAINING DATA A |
| | | | | TRAINING DATA D |
| | | | | ... |
| | | | ABNORMAL BENIGN CASE | TRAINING DATA B |
| | | | | TRAINING DATA C |
| | | | | ... |
| | | | ABNORMAL MALIGNANT CASE | TRAINING DATA E |
| | | | | TRAINING DATA F |
| | | | | ... |
| ... | ... | ... | ... | ... |

| TRAINING DATA | CHANGING HISTORY |
|---|---|
| TRAINING DATA A | — |
| ⋮ | ⋮ |
| TRAINING DATA D | · 2003.09.30 ADDED |
| TRAINING DATA E | · 2003.11.01 ADDED |
| TRAINING DATA F | · 2003.11.01 ADDED<br>· 2003.11.15 CHANGED<br>  ABNORMAL BENIGN<br>  → ABNORMAL MALIGNANT |
| TRAINING DATA G | · 2003.10.01 DELETED |
| ⋮ | ⋮ |

FIG. 8

| USER | DOWNLOADED TRAINING DATA | DOWNLOADED COUNT | CHARGING MONEY AMOUNT |
|---|---|---|---|
| X | TRAINING DATA P<br>TRAINING DATA Q<br>TRAINING DATA R | 20 | 5,000 YEN |
| ... | ... | ... | ... |

531

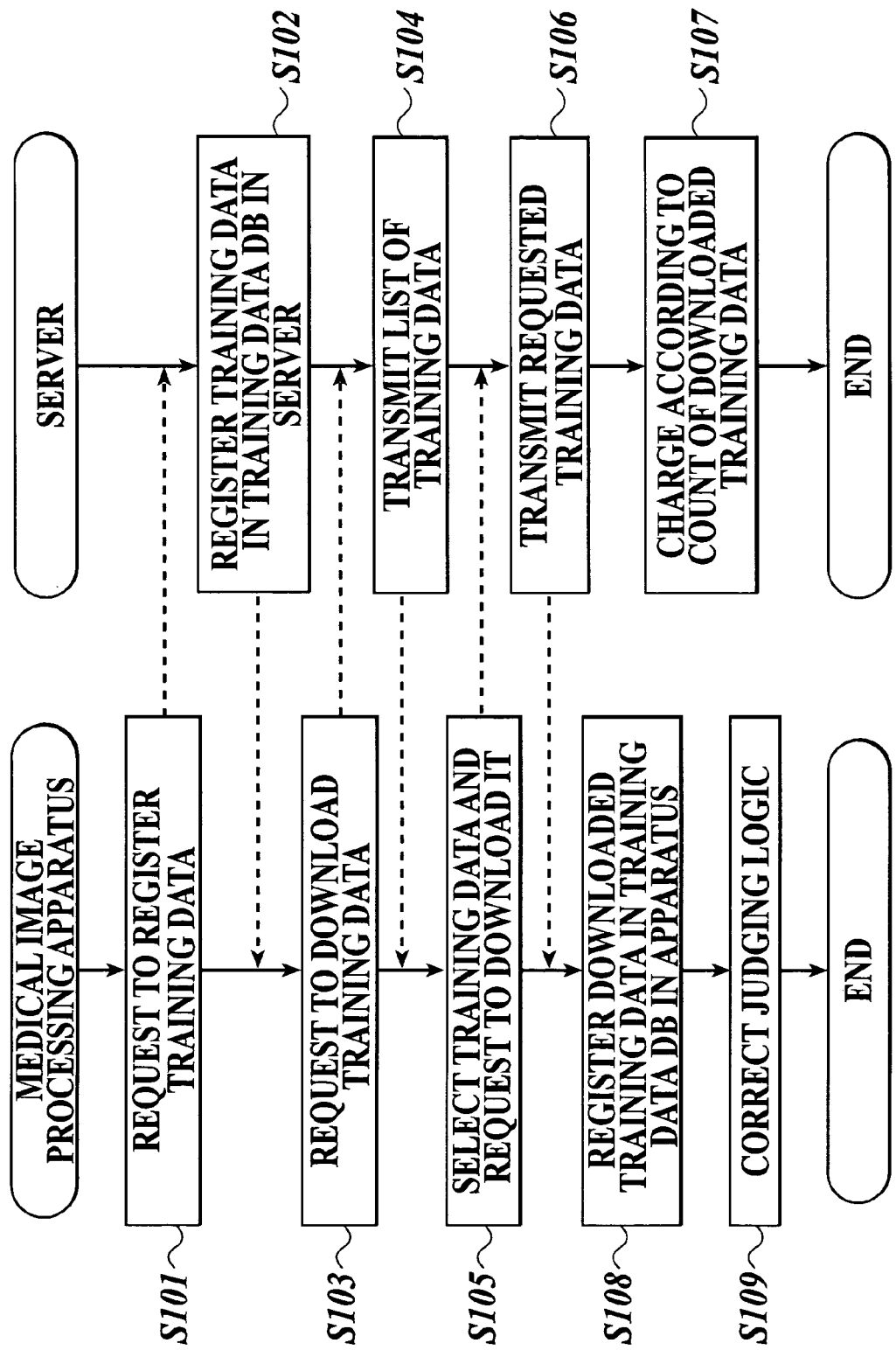

MEDICAL IMAGE PROCESSING APPARATUS AND MEDICAL IMAGE PROCESSING SYSTEM

BACKGROUND OF THE INVENTION

1. Field of the Invention

The present invention relates to a medical image processing apparatus and a medical image processing system which detect a candidate area of abnormal shadow by analyzing a medical image.

2. Description of Related Art

In a medical field, at the time of diagnosis, a doctor interprets a medical image such as an X-ray image, an ultrasound image or the like to find a lesion part and observes the course of disease state. Conventionally, for the purpose of reducing burdens on doctor's interpretation, what is developed is a Computer Aided Diagnosis (hereinafter, it is called CAD) apparatus which automatically detects shadow of a lesion part as an abnormal shadow candidate by image-analyzing image data of a medical image (see JP-Tokukai-2002-112986A).

Among the above-mentioned CAD apparatuses, there are ones to which an algorithm for detecting an abnormal shadow candidate by using sample data which is called training data is applied. In such an algorithm, training data which is previously classified according to a predetermined category such as an abnormal case, a normal case and the like is registered, and according to a judging logic which judges to which category judgment target data inputted based on this training data belongs, the detection of an abnormal shadow candidate is performed. As a judging logic using training data, a discriminant analysis method using the Mahalanobis distance, a method with support vector machine, a method with artificial neural network or the like is used.

The detection of an abnormal shadow candidate in general takes two steps. First, a medical image is analyzed and image feature (hereinafter, it is simply called feature) is calculated, and an area estimated as abnormal shadow is first-detected as an abnormal shadow candidate based on the feature. Next, the feature of the first-detected abnormal shadow candidate is inputted to a judging logic as judgment target data, and a category of the judgment target data is judged based on training data which is previously registered by the judging logic, and a second detection is performed. Then, only the judgment target data which belongs to a category to be outputted as a detection result of an abnormal shadow candidate is outputted as a conclusive detection result.

Since general training data which is previously prepared at manufacturer's side is used as the data to be used in the judging logic, a detection result of an abnormal shadow candidate according to the above-mentioned CAD is constant under the same detecting condition regardless of a doctor who performs the interpretation. However, depending upon a doctor who performs the interpretation, there are some requests such as the request that shadow which is obviously identified as abnormal shadow should not be detected by CAD, the request that specialty of CAD should be enhanced by increasing training data of a case in a field on which a doctor specializes, and the like.

SUMMARY OF THE INVENTION

An object of the present invention is to have a structure where training data is updatable and a detecting condition of an abnormal shadow candidate is customizable.

In accordance with a first aspect of the present invention, a medical image processing apparatus comprises: an abnormal shadow candidate detecting section for detecting an abnormal shadow candidate from a medical image in which an image of a subject is generated, by using a judging logic which performs judgment by using training data; a training data storing section for storing the training data which is used at a detection of the abnormal shadow candidate, so as to make the stored training data updatable; a displaying section for displaying the medical image and a detection result of the abnormal shadow candidate; an area designating section for designating an area to be registered as the training data on the medical image displayed on the displaying section; a data controlling section for having an image of the designated area stored in the training data storing section as the training data; and a logic correcting section for correcting the judging logic of the abnormal shadow candidate detecting section, based on the training data stored in the training data storing section.

According to the apparatus of the first aspect, an image of an area designated as training data to be registered is stored in a training data storing section, and a judging logic is corrected based on a training data group stored in the training data storing section. Therefore, it is possible to newly register training data which is necessary to be added as a case and create an optimal judging logic. Accordingly; it is possible to customize a detecting condition of an abnormal shadow candidate according to a user, whereby, for example, it is possible to enhance the specialty of abnormal shadow candidate detection by increasing cases of a specialized field in a hospital, etc.

Preferably, in the apparatus of the first aspect, the data controlling section has the training data stored in the training data storing section with respect to each user who interprets the medical image.

According to the above-mentioned apparatus, training data is stored with respect to each user that performs interpretation. Therefore, for example, by storing training data with respect to each interpretation doctor, it is possible to customize a detecting condition according to the interpretation doctor, whereby it is possible to do an optimal detection of an abnormal shadow candidate.

Preferably, in the apparatus of the first aspect, the data controlling section has the training data stored in the training data storing section so as to classify the training data into a plurality of categories.

More preferably, the plurality of categories classified into from the training data include any one among: a normal case and an abnormal case; a normal case, an abnormal benign case and an abnormal malignant case; and a detection candidate and a non-detection candidate.

According to the above-mentioned apparatus, training data is stored so as to classify the training data into each category. Therefore, by selecting a category of training data to be registered according to an interpretation skill, preference and the like, it is possible to adjust a detecting condition of an abnormal shadow candidate.

Preferably, the apparatus of the first aspect further comprises a changing section for changing a category into which the training data is classified, in the training data storing section, wherein the logic correcting section corrects the judging logic based on the training data after the category is changed by the changing section.

According to the above-mentioned apparatus, a category of training data is changed. Therefore, according to user's skill, preference and the like, it is possible to adjust a detecting condition of an abnormal shadow candidate by changing a category. For example, since it is possible for an interpretation doctor to judge abnormal shadow having certain characteristic without seeing a detection result by the medical image processing apparatus, by changing training data of such a case from an abnormal case category to a normal case category, it is possible to do the adjustment for making it not detected.

Preferably, the apparatus of the first aspect further comprises a history storing section for storing changing history information as to when the category is changed by the changing section, wherein, after the category of the training data is changed, when the changing section is instructed to change the category of the training data back to the category of before the category is changed, the changing section changes the category of the training data to the category of before the category is changed based on the changing history information stored in the history storing section.

According to the above-mentioned apparatus, changing history information as to when the category is changed is stored and the changed category is changed back to a former category based on this changing history information. Therefore, even if a category is changed by mistake, it is possible to reset a category to a former one.

Preferably, the apparatus of the first aspect further comprises a deleting section for deleting the training data stored in the training data storing section, wherein the history storing section stores history information as to when the deleting section deletes the training data, and after the training data is deleted, when canceling of deletion of the training data is instructed, the changing section returns the deleted training data in a former storing state based on the history information stored in the history storing section.

According to the above-mentioned apparatus, since training data is displayed, it is possible to confirm stored training data.

More preferably, when the deleting section deletes the training data, the logic correcting section corrects the judging logic based on the training data excluding the deleted training data.

According to the above-mentioned apparatus, since training data is deleted, when detection accuracy is lowered down because of adding training data, it is possible to delete the training data of the cause.

Preferably, in the apparatus of the first aspect, the area designating section designates the area on the medical image displayed on the displaying section, based on a point selected by a user.

According to the above-mentioned apparatus, an area to be registered as training data is designated based on a point selected by a user. Therefore, it is possible for a user to designate an area only with the easy operation of selecting a point.

Preferably, in the apparatus of the first aspect, the area designating section designates an area within a contour from a range around the point selected by the user, the contour being extracted by a dynamic contour extraction method.

According to the above-mentioned apparatus, an area extracted by the dynamic contour extraction method is designated as an area to be registered as training data. Therefore, it is possible for a user to designate an automatically-extracted shadow area only with the easy operation of selecting a point.

Preferably, the apparatus of the first aspect further comprises a communicating section for communicating with a server which comprises a training data storing section for storing the training data used by a plurality of medical image processing apparatuses so as to make the stored training data updatable, wherein the data controlling section has the communicating section transmit the training data stored in the training data storing section of the medical image processing apparatus to the server to be stored in the training data storing section of the server.

More preferably, the displaying section selectively displays the training data stored in the training data storing section of the server when the training data is obtained from the server.

According to the above-mentioned apparatus, training data registered by the medical image processing apparatus is stored in the training data storing section of the server. Therefore, it is possible to integrally manage training data in the server, the training data being registered by each medical image processing apparatus.

Preferably, in the apparatus of the first aspect, the data controlling section has the communicating section transmit request information which is for requesting the training data stored in the training data storing section of the server to the server for obtaining the training data from the server, and has the obtained training data stored in the training data storing section of the medical image processing apparatus.

According to the above-mentioned apparatus, the medical image processing apparatus obtains training data stored in the server and has it stored in the training data storing section thereof. Therefore, it is possible to obtain training data registered by another medical image processing apparatus and add it into a case, and it is possible to re-obtain lost training data.

Preferably, the apparatus of the first aspect further comprises a detection result storing section for storing information of the detection result of the abnormal shadow candidate so as to relate the information with information of the training data used in the detection.

According to the above-mentioned apparatus, information of a detection result of an abnormal shadow candidate is stored so as to relate it with information of training data used in the detection. Therefore, it is possible to trace back the training data used in the detection to conform it later.

In accordance with a second aspect of the present invention, a medical image processing system comprises: a medical image processing apparatus; and a server connected by to the medical image processing apparatus, wherein the medical image processing apparatus comprises: an abnormal shadow candidate detecting section for detecting an abnormal shadow candidate from a medical image in which an image of a subject is generated, by using a judging logic which performs judgment by using training data; a training data storing section for storing the training data which is used at a detection of the abnormal shadow candidate, so as to make the stored training data updatable; a displaying section for displaying the medical image and a detection result of the abnormal shadow candidate; an area designating section for designating an area to be registered as the training data, on the medical image displayed on the displaying section; and a data controlling section for having an image of the designated area stored in the training data storing section of the medical image processing apparatus and stored in a training data storing section of the server as the training data, and the server comprises the training data storing section for storing the training data which is used by the medical image processing apparatus so as to make the stored training data updatable.

Preferably, the server comprises a providing section for providing the training data stored in the training data storing section of the server to the medical image processing apparatus, according to a request from the medical image processing apparatus, and the data controlling section of the medical image processing apparatus transmits request information for requesting the training data stored in the training data storing section of the server to the server for obtaining the training data from the server, and stores the obtained training data in the training data storing section of the medical image processing apparatus.

According to the system of the second aspect, the medical image processing apparatus obtains training data stored in the server and has it stored in the training data storing section thereof. Therefore, it is possible to obtain training data registered by another medical image processing apparatus and add it into a case, and it is possible to re-obtain lost training data.

Preferably, in the system of the second aspect, the data controlling section of the medical image processing apparatus transmits user information of a user who has requested the training data with the request information of the training data to the server for obtaining the training data from the server, and the server comprises a charging section for charging each user that has requested the training data, according to a count of the training data provided by the providing section.

According to the above-mentioned system, it is possible to charge each user according to a count of training data provided to the medical image processing apparatus.

Preferably, the system of the second aspect further comprises a detection result storing section for storing information of the detection result of the abnormal shadow candidate by the abnormal shadow candidate detecting section so as to relate the information with information of the training data used by the detection.

According to the above-mentioned system, information of a detection result of an abnormal shadow candidate is stored so as to relate it with information of training data used in the detection. Therefore, it is possible to trace back the training data used in the detection to conform it later.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 5 is a view showing an example of a data structure of a registration table within the training data DB, FIG. 6 is a view showing an example of a data structure of a changing history table within the training data DB FIG. 8 is a view showing an example of a data structure of an accounting table within the storing unit, FIG. 13 is a flowchart illustrating a training data providing process performed by the medical image processing apparatus and the server.

PREFERRED EMBODIMENTS OF THE INVENTION

In the present embodiment, what will be described are an example of a medical image processing apparatus which registers an image of an area designated in a medical image to database as training data and corrects a judgment parameter in a judging logic at the time of detecting an abnormal shadow candidate based on the training data registered in the database, and an example of a medical image processing system which uploads training data which is newly registered in each medical image processing apparatus to a database in a server, and is capable of obtaining the training data registered in the database in the server from any medical image processing apparatus.

First, a structure of the present embodiment will be described.

Figure 1:
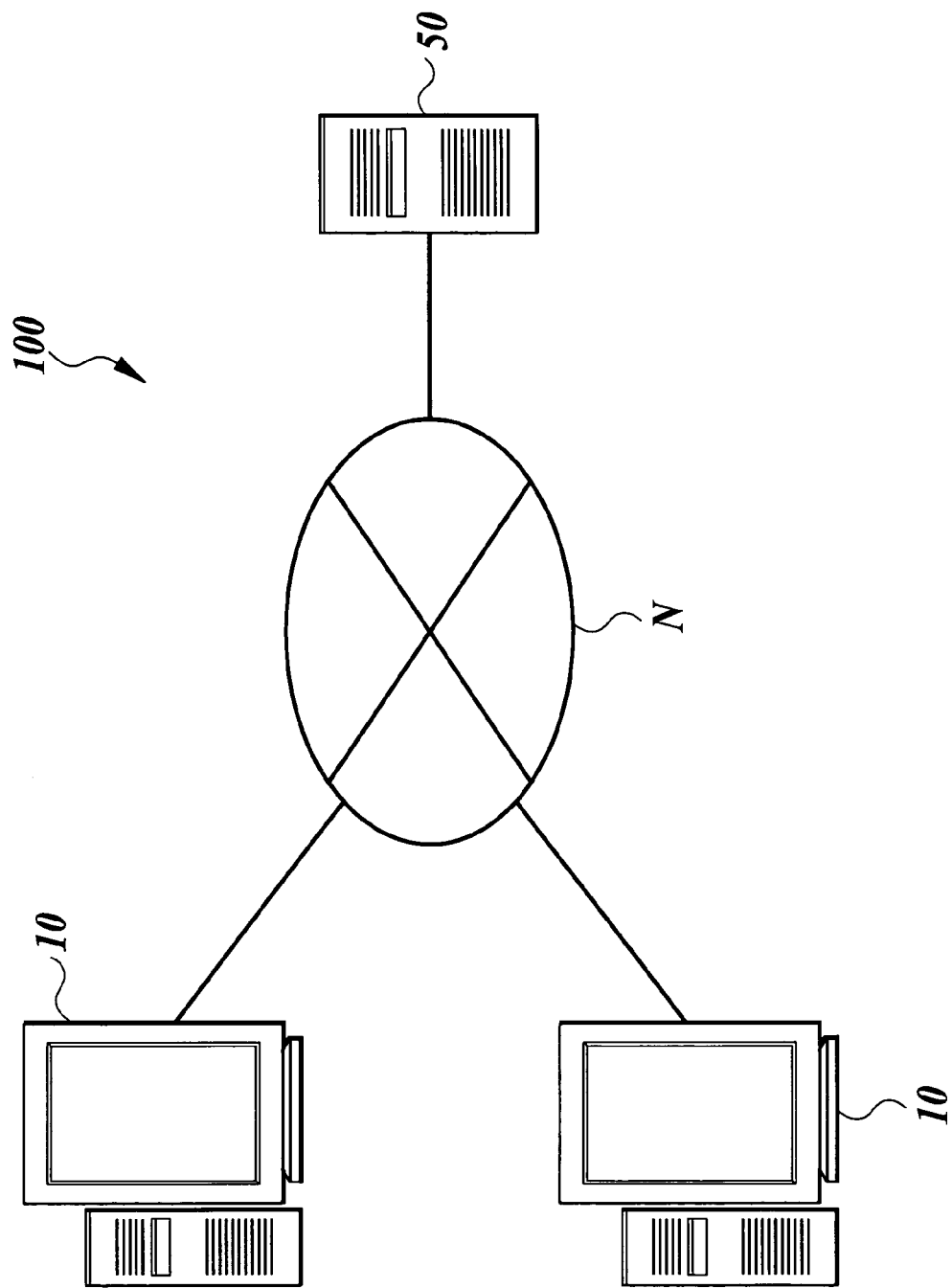
FIG. 1 is a view showing a system structure of a medical image processing system in the present embodiment.

FIG. 1 shows a system structure of a medical image processing system 100 in the present embodiment. As shown in FIG. 1, the medical image processing system 100 comprises a medical image processing apparatus 10 and a server 10 so that each apparatus can mutually transmit/receive data through a communication network. Here, in FIG. 1, described is the example that two medical image processing apparatuses 10 and one server 50 are connected. However, the number of each apparatus is not in particular limited.

Hereinafter, each apparatus will be described.

The medical image processing apparatus 10 detects an abnormal shadow candidate by image-analyzing an inputted medical image. Further, the medical image processing apparatus 10 displays the detection result along with the medical image at the time of interpretation.

Figure 2:
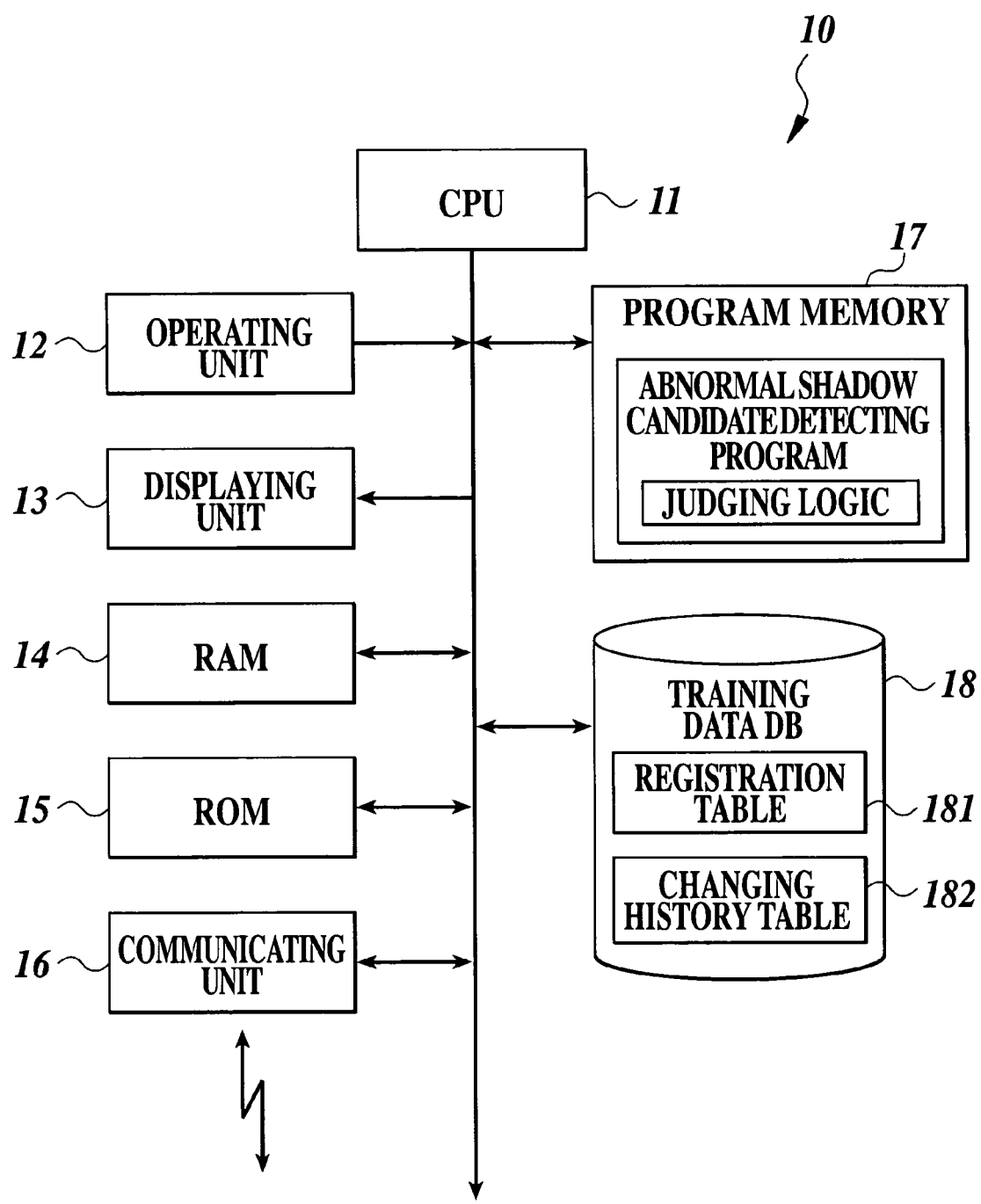
FIG. 2 is a view showing an internal structure of the medical image processing apparatus of FIG. 1.

FIG. 2 shows an internal structure of the medical image processing apparatus 10.

As shown in FIG. 2, the medical image processing apparatus 10 comprises a CPU (Central Processing Unit) 11, an operating unit 12, a displaying unit 13, a RAM (Random Access Memory) 14, a ROM (Read Only Memory) 15, a communicating unit 16, a program memory 17, and a training database (hereafter, it is called DB; DataBase).

The CPU 11 develops a system program stored in the program memory 18 and an abnormal shadow candidate detecting program into the RAM 14, and centrally controls operations of each unit of the medical image processing apparatus 10 in conjunction with the program.

In the abnormal shadow candidate detecting process, through a first detection which is for specifying a candidate area and a second detection which is for the specified candidate area, a conclusive detection result is outputted.

Hereafter, what will be described as an example is a case of detecting a mass shadow candidate which can be a finding of breast cancer in an X-ray medical image in which a mamma of a patient is radiographed (this is called mammography). Here, if an abnormal shadow candidate of each lesion type is to be detected from other types of medical images, such as an ultrasound image, an MRI (Magnetic Resonance Imaging) image and the like, a detecting method corresponding to its image type and/or lesion type is applied.

Mass shadow has a shape close to a circle, and appears on a mammography as low-density shadow having density variation being similar to the Gaussian distribution. Based on such distinctive density variation, at the first detection, as disclosed in JP-Heisei-08-263641A as an example, intensity component and direction component of density gradient from peripheral parts of a pixel of interest to the pixel of interest are calculated as feature with the use of the Iris filter, and a candidate area is specified based on the feature. The candidate specified in the first detection is called a first candidate.

Here, the above-mentioned detecting method is one example, and therefore it is possible to apply other known detecting methods, such as a method using the Laplacian filter (Journal of Japan Society of Medical Imaging and Information Sciences (D-II), Vol. J76-D-II, no.2, pp 241-249, 1993) and the like.

In the second detection, calculated are various features such as contrast, standard deviation, density mean value, curvature, fractal dimension, circularity, area and the like each of which is in regard to the first detection area. Then, by inputting the calculated features to a judging logic as judgment target data, the judging logic being built based on training data group which is previously stored in the training data DB 18, to which category the judgment target data belongs is judged. Here, the category can be set by a user, and is set according to an initial setting. As an example of the category, a category of whether a normal case or an abnormal case, a category of whether a detection candidate which a user wishes the detection of and a non-detection candidate which a user does not wish the detection of, and the like can be cited.

As the judging logic, for example, it is possible to apply a hierarchical-type neural network to which the BP (Back Propagation) method is applied, discriminant analysis with linear discriminant or the Mahalanobis distance, support vector machine and the like.

Figure 3A:
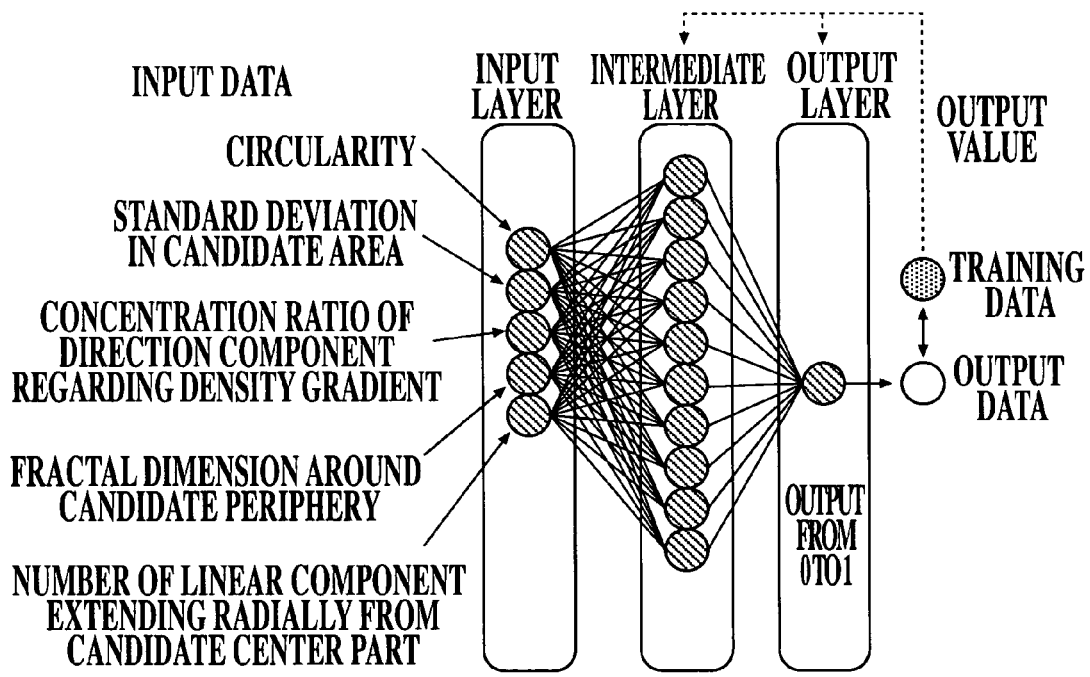
FIG. 3A is a conceptual view of a judging logic to which neural network is applied.

The neural network of the BP method comprises, as shown in FIG. 3A, an input layer having neurons for receiving input data, an output layer having a neuron for outputting output data to the outside, and an intermediate layer having neurons existing between the input layer and the output layer. A bias function which performs the weighting on an inputted signal or the like is set to each neuron of the input layer and the intermediate layer, and training data is set to the neuron of the output layer as output data which is expected with respect to certain input data. When output data is outputted from the output layer, the BP method corrects the bias function of the intermediate layer and the output layer based on the error between the output data and the training data. What becomes a judgment parameter for the neural network of this BP method is a weighing coefficient of the bias function set to the intermediate layer and the output layer, and the like.

Figure 3B:
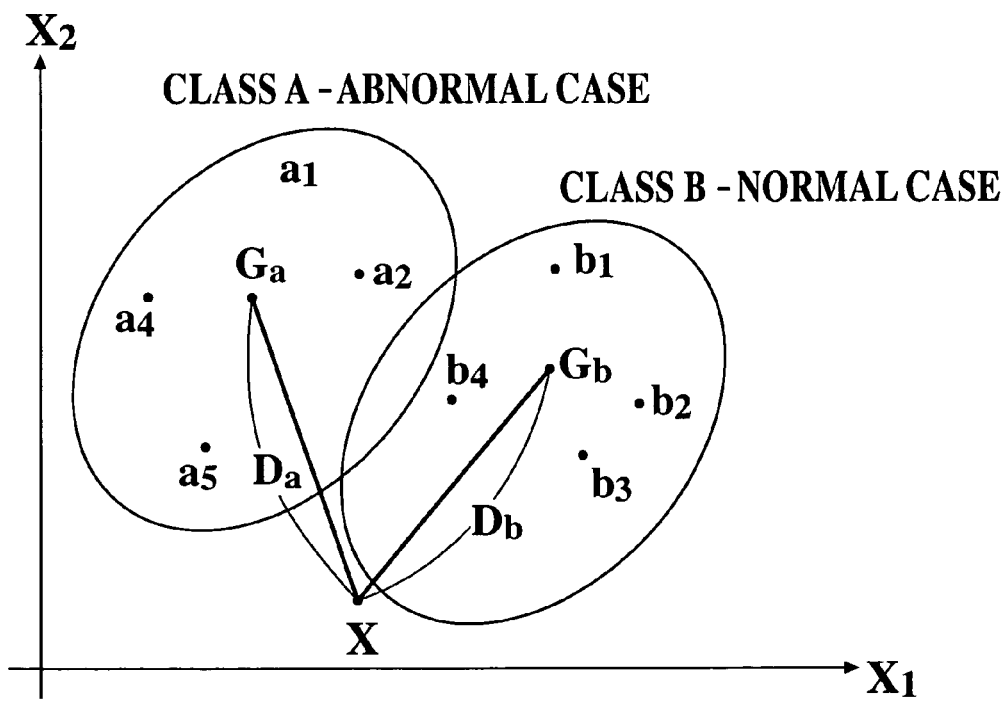
FIG. 3B is a conceptual view of a judging logic using discriminant analysis with the Mahalanobis distance.

As shown in FIG. 3B, the Mahalanobis distance is a judging logic which judges a class to which judgment target data X belongs by judging which center of gravity the judgment target data X is closer to in consideration of the variance of the training data between a center of gravity Ga of parent population A class comprising training data a1 to a5 belonging to a category of an abnormal case, and a center of gravity Gb of parent population B class comprising training data b1 to b4 belonging to a category of normal case. At this time, the centers of gravity Ga, Gb and the like of each class become a judgment parameter, and positions of these centers of gravity Ga, Gb are moved according to adding training data, changing a category, deleting a category and the like.

Figure 4:
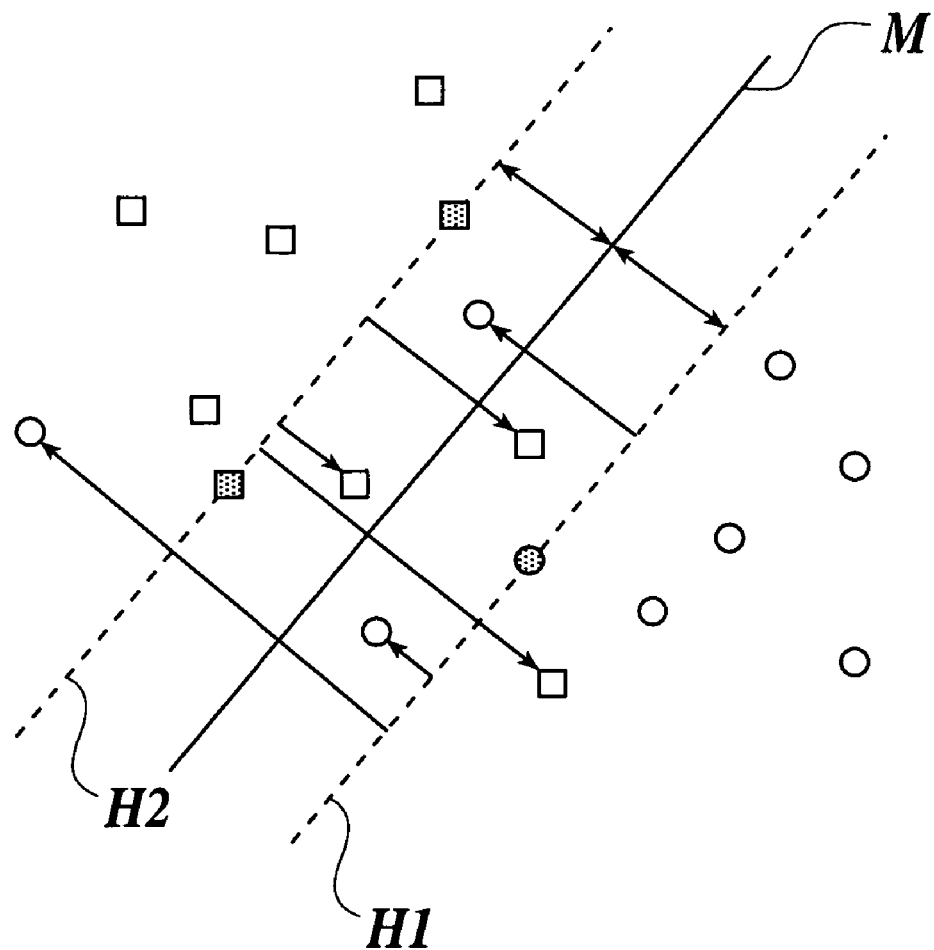
FIG. 4 is a conceptual view of a judging logic to which support vector machine is applied.

Further, as shown in FIG. 4, the support vector machine is a judging logic which judges to which category judgment target data belongs by calculating a distinguishing function which distinguishes between training data belonging to an abnormal case (which is indicated with "□" in FIG. 4) and training data belonging to a normal case (which is indicated with "○" in FIG. 4), for example. In this support vector machine, in adjacent spaces of a hyperplane which correctly distinguishes all training data, an optimal distinguishing function having the largest margin area in which training data does not exist (areas of H1 and H2 around the hyperplane M) becomes a judgment parameter.

As a result of the judgment according to the judging logic, only the first candidate that is judged to belong to, for example, a category of an abnormal case or a category of a detection candidate is outputted as a conclusive detection result of an abnormal shadow candidate through the first detection and the second detection. Then, the CPU 11 stores features of the abnormal shadow candidate which is used and outputted in the detection in the ROM 15 so as to relate the features with information of the training data used in the detection. That is, it is possible to realize the abnormal shadow candidate detecting section by the combination of the abnormal shadow candidate detecting program and the CPU 11.

Further, the CPU 11 develops a registration processing program (see FIG. 9), an editing processing program (see FIG. 12) and a training data providing processing program (see FIG. 13), each regarding the present invention, into the RAM 14, and centrally controls processing operations in conjunction with each program.

In the registration process, an area within a contour extracted by a dynamic contour extraction method is designated in a range around an any point selected by a user through the operating unit 12, and an image of the designated area is stored in the training data DB 18 as training data. Here, the dynamic contour extraction method is a method also known as Active contour model (Snakes). With Active contour model, a contour is dynamically determined by setting a plurality of candidate points in a target image area from which the contour is to be extracted, by calculating, with respect to the plurality of candidate points, internal energy which defines smoothness of the contour, image energy which is set so as to make energy smallest at the border of the area, and external energy which is set so as to expanding the area from an initial area, and by controlling the candidate points so as to make the sum of each energy smallest. In other words, by the combination of the registration processing program and the CPU 11, it is possible to realize the data controlling section. Further, it is possible to realize the area designating section by the operating section 12 and the CPU 11.

Further, when a classification category to which training data belongs is selected by a user at the time of storing the training data, information of the classification category to which the training data belongs is written in a registration table 181 (which will be described later) within the training data DB 18.

In the editing process, when changing of a category to training data stored in the training data DB 18 is instructed by a user through the operating unit 12, a classification category of the training data to which the changing is instructed is overwritten on a designated classification category. Then, in a changing history table 182 (which will be described later), changing history information such as its changing date, changing content and the like is written. Further, when deleting is instructed by a user, registration information of training data to which the deleting is instructed is deleted from the registration table 181, and information such as its deleting date and the like is written in the changing history table 182. In other words, by the combination of the editing processing program and the CPU 11, it is possible to realize the changing section and the deleting section.

In a training data providing processing program, training data stored in the training data DB 18 is read out and transmitted to the server 50 by the communicating unit 16, and is stored in the training data DB in the server 50 for uploading the training data. Further, when an instruction to download training data stored in the server 50 is inputted, request information which requests the training data selected by a user is transmitted to the server 50 by the communicating unit 16 for obtaining the training data from the server 50 (downloading the training data).

Further, when training data in the training data DB 18 is either added, changed or deleted in the registration process, the editing process or the like, based on training data group after the adding, changing or the deleting, the CPU 11 calculates a judgment parameter for a judging logic, and the CPU 11 sets the judgment parameter to the judging logic to correct the judging logic. In other words, by the combination of each program and the CPU 11, it is possible to realize the logic correcting section.

The operating unit 12 comprises a keyboard having cursor keys, numeric keys and various types of function keys, and a pointing device such as a mouse, a touch panel or the like. The operating unit 11 outputs an operation signal corresponding to a pushed key an operation of the mouse to the CPU 11.

The displaying unit 13 is the displaying section comprising an LCD (Liquid Crystal Display) or the like. The displaying unit 13 displays various types of display screens such as a medical image, a detection result of an abnormal shadow candidate by the CPU 11, a selection screen for selecting a category of training data, and the like.

The RAM 14 forms a work area for temporarily storing various programs to be executed by the CPU 11, data processed by these programs, and the like.

The ROM 15 stores image data group of medical images to be processed, and various information which is necessary for detecting an abnormal shadow candidate, for example, a judgment parameter which is set in a judging logic, and the like.

Further, the ROM 15 is the detection result storing section which stores information of a detection result of an abnormal shadow candidate in an abnormal shadow candidate detecting process, so as to relate the information with information of training data which is used for the detection.

The communicating unit 16 comprises a communications interface such as a network interface card (hereafter, it is called NIC; Network Interface Card), a modem, a terminal adapter or the like, and performs transmission/reception of various information to/from an external device on the communication network. For example, the communicating unit 16 transmits training data which is to be registered in DB, to the server 50. Further, it is possible to connect the communicating unit 16 to a diagnosis terminal which is set up in each diagnosis room, for transmitting a detection result of an abnormal shadow candidate.

Further, the communicating unit 16 is (telecommunicated) connected to a medical image generating apparatus (not shown in figures) receives image data of a medical image from the medical image generating apparatus.

Here, the input of a medical image is not limited to this inputting method. For example, the medical image processing apparatus 10 may comprise an interface to be connected to the medical image generating apparatus so that a medical image generated in the medical image generating apparatus is inputted to the medical image processing apparatus 10 through this interface.

As the medical image generating apparatus, for example, it is possible to apply a laser digitizer which reads a medical image by scanning a laser beam over a file in which the medical image is recorded, a film scanner which reads a medical image recorded in a film with a sensor comprising a photoelectric transducer such as a CCD (Charge Coupled Device) or the like, etc.

Further, a method of inputting a medical image is not in particular limited to reading a medical image recorded in a film. For example, it is possible to have a structure in which the medical image processing apparatus is connected to an image generating apparatus which generates a medical image with accumulative phosphor, a flat panel detector which comprises a condenser and a radiation detecting device for generating electric charge corresponding to irradiated radiations, or the like.

The program memory 17 stores a system program, an abnormal shadow candidate detecting program, a registration processing program, an editing processing program, a training data providing processing program, data processed by each program, etc.

The training data DB 18 is the training data storing section comprising a large-capacity memory, and stores training data to be used by a judging logic. Further, the training data DB 18 comprises the registration table 181 for storing registration information regarding training data which is registered in DB, and the changing history table 182 for storing changing history information such as changing, deleting and the like of the registered training data. In other word, it is possible to realize the history storing section by the training data DB 18.

As shown in FIG. 5, in the registration table 181, stored is information of training data (for example, "TRAINING DATA A", "TRAINING DATA D", and the like) for each lesion type of the training data (for example, "MASS") and for each category to classify the training data (for example, "NORMAL CASE", "ABNORMAL BENIGN CASE" which is an abnormal but benign case, and "ABNORMAL MALIGNANT CASE" which is an abnormal and malignant case), so as to relate the information of training data with user information such as user name (for example, "DOCTOR X" and the like) and user's affiliated department (for example, "INTERNAL MEDICINE" and the like).

As shown in FIG. 6, in the changing history table 182, stored is changing history information such as a date on which the category is changed or deleted, its changed/deleted content and the like (for example, "2003.11.15 changed (AB-NORMAL BENIGN→ABNORMAL MALIGNANT)" which indicates the changing of a category from an abnormal benign case to an abnormal malignant case on Nov. 15, 2003), so as to relate the changing history information with a data file name of each training data (for example, "TRAINING DATA A").

Further, the training data DB 18 comprises a feature file (which is not shown in figures) for storing data of features of training data registered in the training data DB 18. For example, the training data DB 18 stores data of various features such as contrast, standard deviation, mean density value, curvature, circularity, area and the like.

Next, the server 50 will be described.

In the server 50, built is a database of training data to be used by each medical image processing apparatus 10 on the communication network N. Further, a web page for providing training data registered in the database is managed in the server 50, and the server 50 provides the training data according to a request through the web page from the medical image processing apparatus 10.

Figure 7:
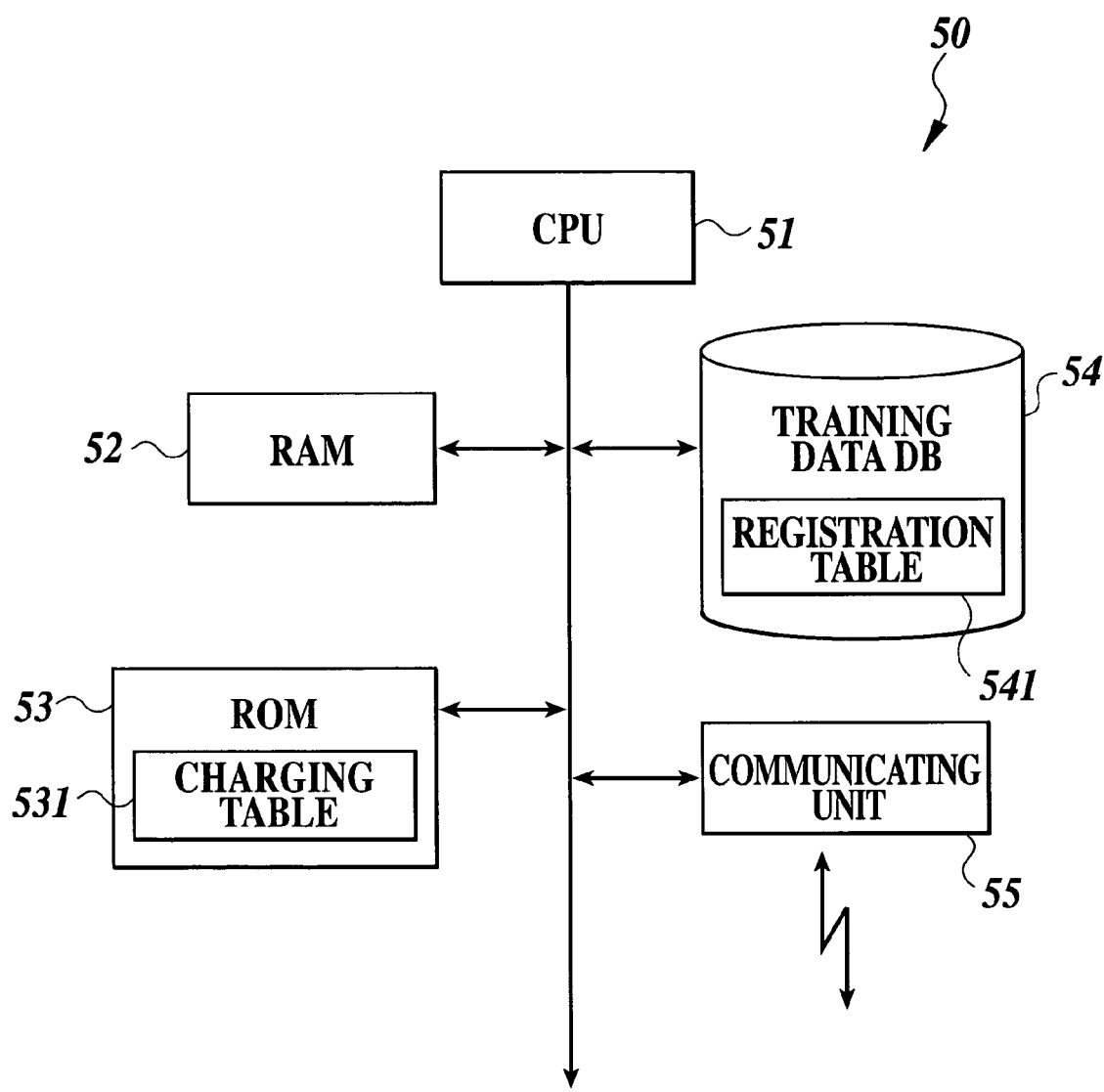
FIG. 7 is a view showing an internal structure of the server of FIG. 1.

FIG. 7 shows an internal structure of the server 50.

As shown in FIG. 7, the server 50 comprises a CPU 51, a RAM 52, a ROM 53, a training data DB 54 and a communicating unit 55.

The CPU 51 develops a system program stored in the ROM 53 and a training data providing processing program regarding the present invention into the RAM 52, and centrally controls processing operations in conjunction with the program.

In a training data providing process, according to a request to do the registration in the database from the medical image processing apparatus 10, training data transmitted from the medical image processing apparatus 10 through the communicating unit 55 is stored in the training data DB 54. Further, according to a request to download training data from the medical image processing apparatus 10, selected training data is read out from the training data DB 54 and transmitted to the medical image processing apparatus 10 by the communicating unit 55, for providing the training data to each medical image processing apparatus 10. Further, when training data is provided, money amount corresponding to provided training data count is calculated, and the calculated money amount is written for each user in a charging table 531 in the ROM 53 to do the charging. In other words, by the combination of the training data providing processing program and the CPU 51, it is possible to realize the providing section and the charging section.

The RAM 52 forms a work area for temporarily storing various types of programs to be executed by the CPU 51, data processed by these programs, etc.

The ROM 53 stores a system program, the training data providing processing program, data processed by each program, etc. Further, the ROM 53 comprises the charging table 31 for managing a charging state of each user with respect to training data stored in the training data DB 54.

As shown in FIG. 8, in the charging table 531, stored is each information such as a data file name of downloaded training data (for example, "TRAINING DATA P", "TRAINING DATA Q", and the like), total count of the downloaded training data (for example, "20"), and charging money amount with respect to the downloaded training data (for example, "5000 YEN"), so as to relate each information with a user name who downloaded the training data (for example, "X").

The training data DB 54 is the training data storing section comprising a large-capacity memory, and stores training data registered by each medical image processing apparatus on the communication network N. Further, the training data DB 54 comprises a registration table 541 for storing registration information regarding training data registered in the training data DB 54. Since a data structure of the registration table 541 is that of the registration table 181 of the medical image processing apparatus 10 described with reference to FIG. 5, its illustration and description are omitted. In other words, in the registration table 541, stored is each information such as a classification category of training data and a file name of training data which belongs to the classification category so as to relate each information with a user name and user information of an affiliated department of the user.

Further, the training data DB 54 comprises a feature file for storing data of features of the stored training data. In the feature file, stored is data of each feature such as contrast, standard deviation, mean density value, curvature, circularity, area and the like.

The communicating unit 55 comprises a communications interface such as an NIC, a modem, a terminal adaptor or the like, and transmits/receives various information to/from an external device on the communication network N. For example, the communication unit 55 receives training data which is uploaded from the medical image processing apparatus 10, and transmits training data of which downloading is requested among the training data stored in the training data DB 54 to the medical image processing apparatus 10.

Next, an operation in the present embodiment will be described.

In the present embodiment, what will be described are the case that training data is added to, changed and deleted from the training data DB 18 in the medical image processing apparatus 10, and the case that the server 50 manages all the training data registered by each medical image processing apparatus 10 and provides training data to each medical image processing apparatus 10 according to a request.

First, with reference to FIG. 9, a registration process which adds training data to the training data DB 18 in the medical image processing apparatus 10 will be described. Here, as under the description, it is assumed that a user is identified according to a login identification which is performed at the time of booting up the medical image processing apparatus 10.

Figure 9:
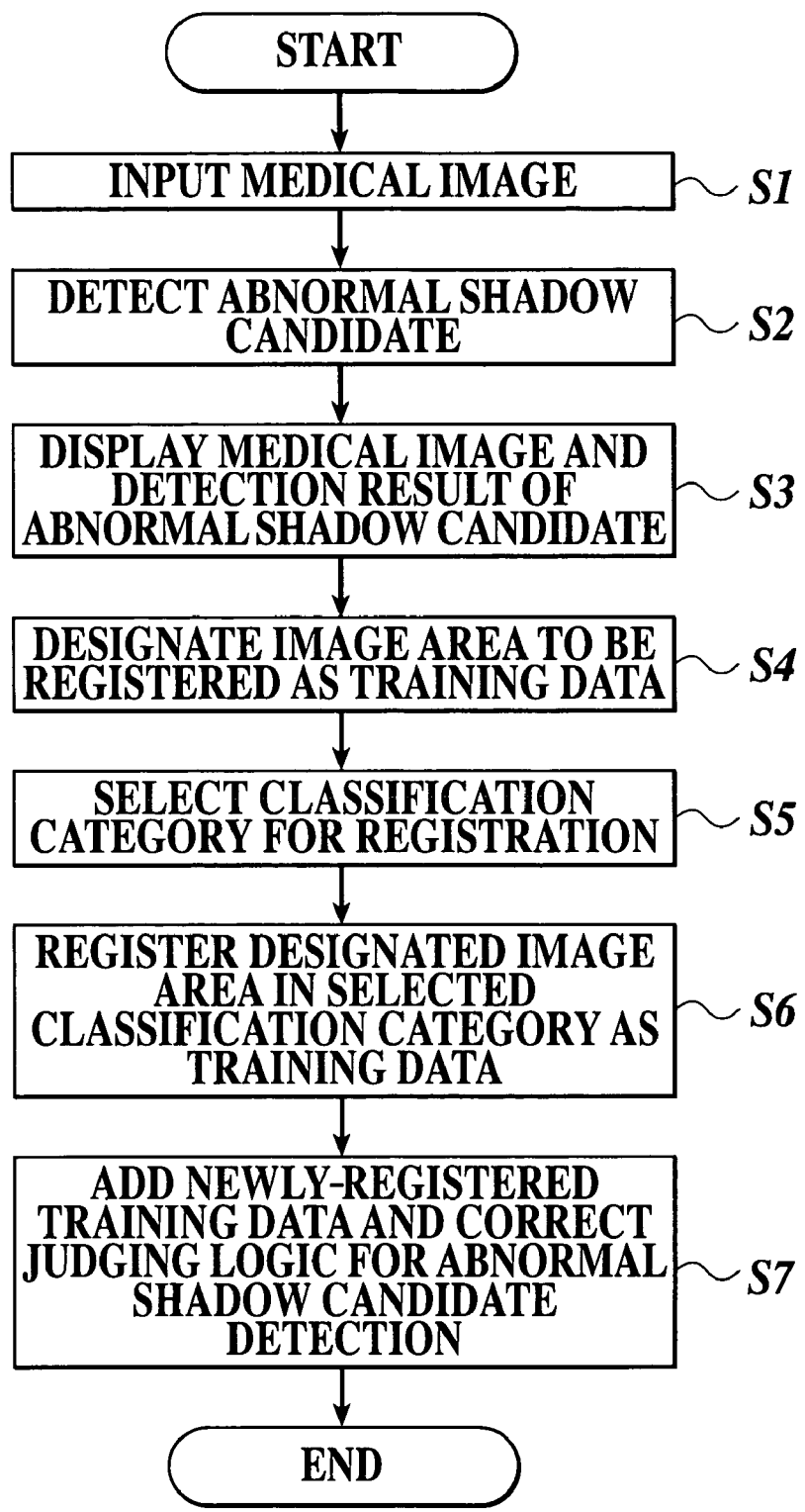
FIG. 9 is a flowchart illustrating a registration process performed by the medical image processing apparatus.

In the registration process shown in FIG. 9, when a medical image is inputted through the communicating unit 16 (Step S1), the CPU 11 detects an abnormal shadow candidate over the medical image (Step S2). Next, when the detection is completed, the medial image and the detection result of an abnormal shadow candidate are displayed on the displaying unit 13 (Step S3).

Figure 10:
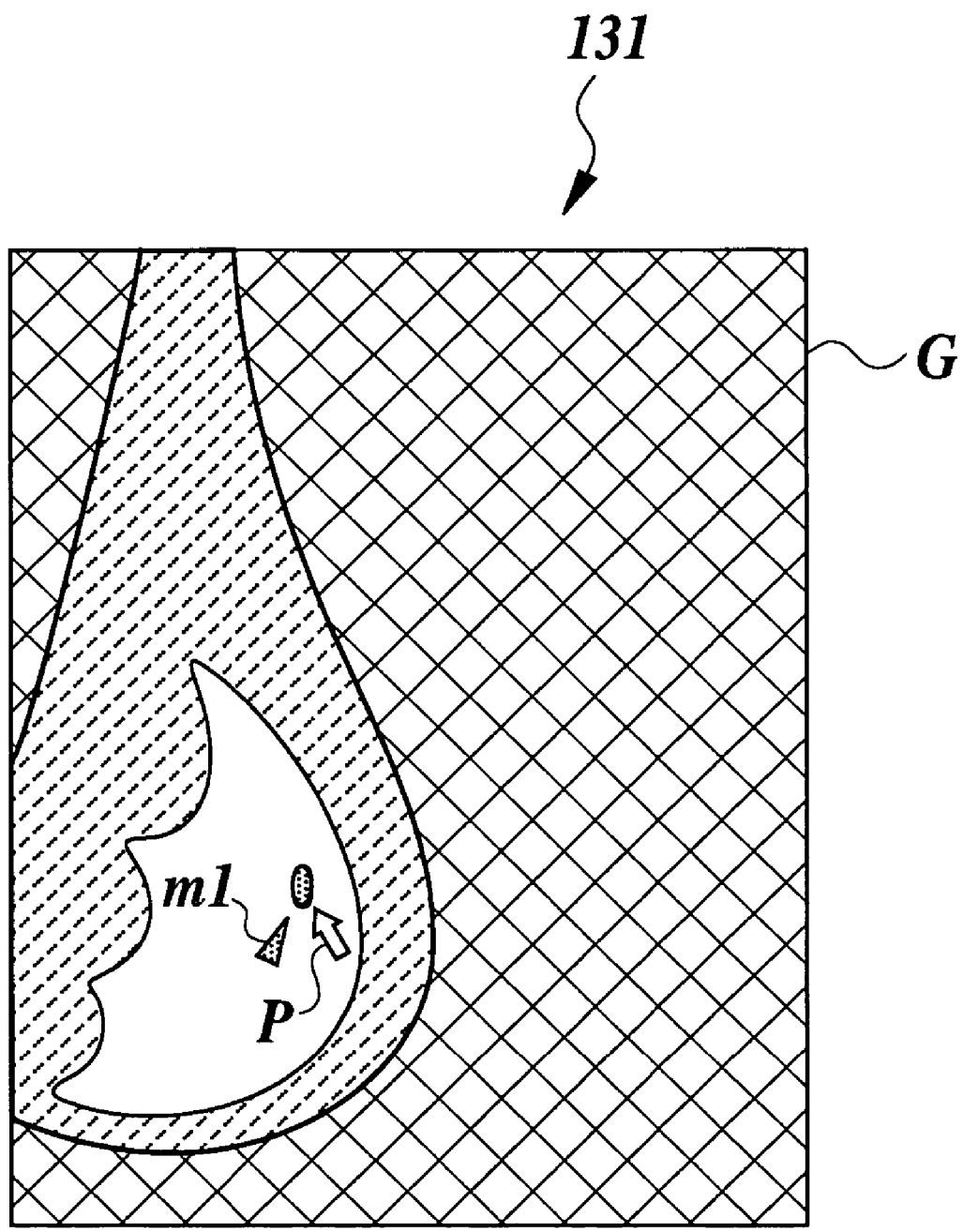
FIG. 10 is a view showing an example of a display screen of a medical image and a detection result of an abnormal shadow candidate which are displayed during the registration process.

FIG. 10 shows an example of its display screen.

As shown in FIG. 10, on the displaying unit 13, displayed is a result screen 131 in which a medical image G is shown. On the result screen 131, a marker m1 indicating an abnormal shadow candidate which is detected as the detection result of an abnormal shadow candidate is shown over the medical image G. Further, a pointer p for indicating an image area which is to be registered as training data is displayed on the displaying unit 13. A user operates this pointer p and selects a point around the center of the image area to be registered as training data through the operating unit 12 when registering the training data.

When the pointer p is operated through the operating unit 12 and a certain point is selected on the result screen 131, the CPU 11 extracts the contour within a predetermined range with respect to the selected point according to the dynamic contour extraction method, a d an image area within the extracted contour is designated as an image area to be registered as training data (Step S4).

Here, in the present embodiment, described is the example that an image area of shadow is designated according to the dynamic contour extraction method. However, a method of designating shadow is not limited to the dynamic contour extraction method. For example, it is possible to designate an image area of an abnormal shadow candidate detected within a predetermined range with respect to a point selected by the pointer p, or, if an image area is to be designated in a range in which an abnormal shadow candidate is not detected, it is possible to operate the pointer p so as to surround an image area to be registered to designate an image area.

Figure 11:
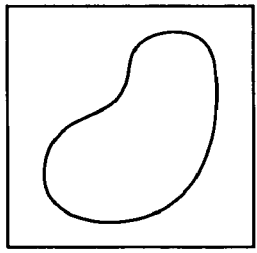
FIG. 11 is a view showing an example of a selecting screen of a classification category which is displayed when training data is to be registered.

When an image area to be registered as training data is designated, a selection screen for selecting to which category the training data to be registered is classified is displayed on the displaying unit 13. FIG. 11 shows an example of its selection screen. As shown in FIG. 11, on the selection screen, an image g1 which is the image area designated as the training data is displayed and classifying categories are selectively displayed. A user confirms the image g1 on the selection screen 132 and selects a classifying category.

Here, if an image area of an abnormal shadow candidate detected by the medical image processing apparatus 10 is designated, only classifying categories are selectively displayed as shown in FIG. 11. However, if an image area in which an abnormal shadow candidate is not detected by the medical image processing apparatus 10 is designated, not only are classifying categories selectively displayed, but also an input area for inputting a lesion type name of shadow is displayed.

When a category is selected on this selection screen (Step S5), training data is newly registered by storing an image of the designated area in the training data DB 18 as training data DB 18, and by storing information of the selected category (and information of a lesion type name if the lesion type name is inputted), adding date and the like in the registration table 181 so as to relate them with a user identified at the login identification (Step S6).

Next, based on training data group which is existing training data and the newly-registered training data in the training data DB 18, the CPU 11 corrects a judgment parameter which is used in a judging logic for the second detection of an abnormal shadow candidate (Step S7). For example, if a neural network is applied as a judging logic, training data set in the output layer is newly set. Further, if a method of the Mahalanobis distance is applied as a judging logic, population mean (center of gravity) of each category is newly calculated based on a training data group of each category, and if the support vector machine is applied as a judging logic, an optimal distinguishing function is newly calculated and set to the judging logic.

When a judgment parameter is corrected in this way, the present process is completed. In the abnormal shadow candidate detecting process thereafter, the second detection is performed based on the judging logic to which a corrected judgment parameter is set.

Figure 12:
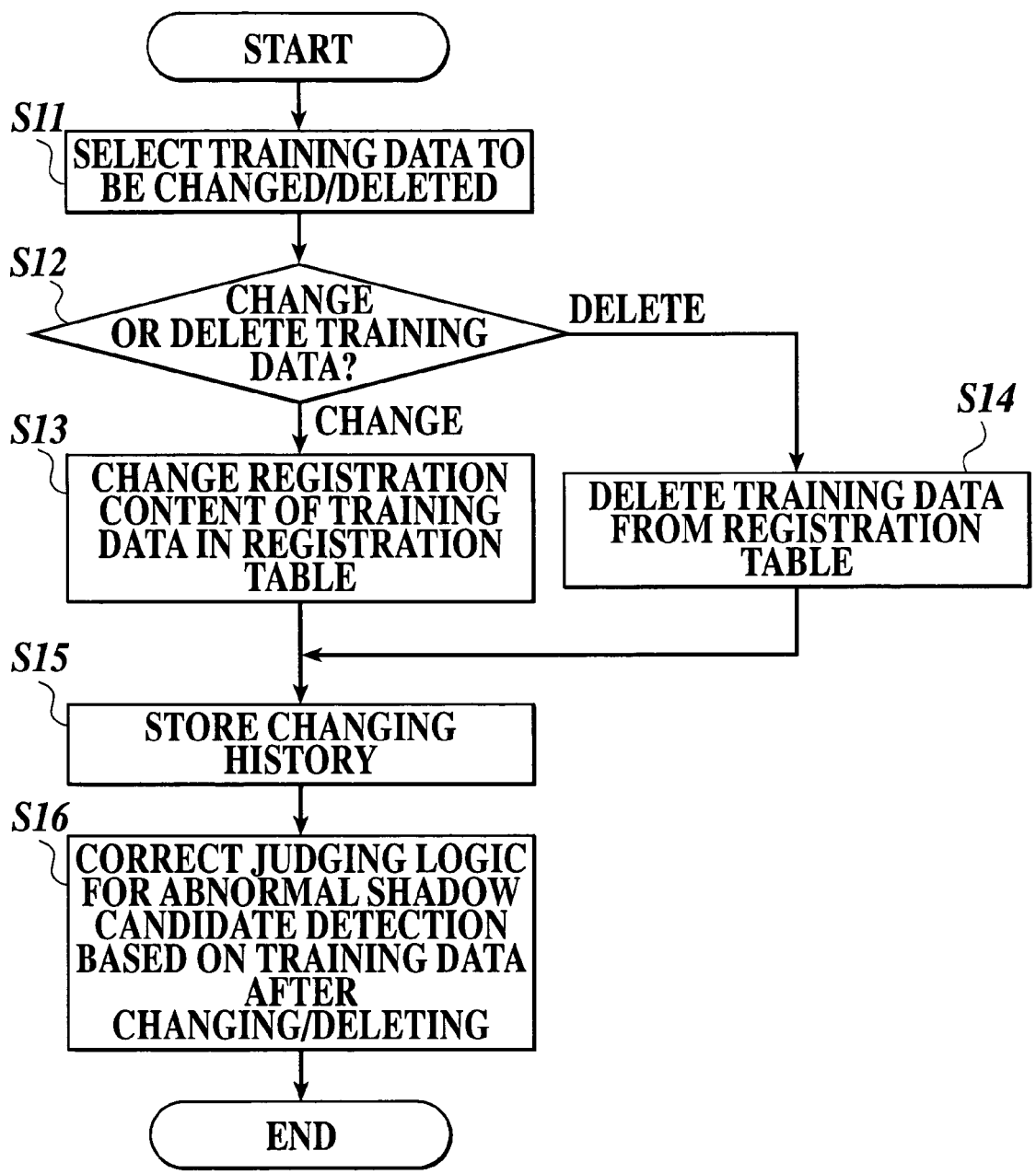
FIG. 12 is a flowchart illustrating an editing process performed by the medical image processing apparatus.

Next, with reference to FIG. 12, the editing process which, after training data is registered in the training data DB 18 of the medical image processing apparatus 10, changes and deletes the registered training data will be described. FIG. 12 is a flowchart illustrating the editing process performed by the medical image processing apparatus 10. Under the description, it is assumed that it is possible to give an instruction to change and delete training data from a editing menu.

In the editing process shown in FIG. 12, first, images of training data registered in the training data DB 18 are displayed as a list according to the editing menu. Then, when a user selects training data to be changed among the list-displayed training data through the operating unit 12 (Step S11), whether changing training data or deleting training data is instructed through the operating unit 12 is judged (Step S12).

If changing training data is instructed (Step S12; CHANGE), a selection screen (see FIG. 11) for selecting a category to be changed to is displayed on the displaying unit 13. Then, when a category to be changed to is selected on the selection screen, a category of the selected training data is changed to the selected category in the registration table 181 (Step S13), and the operation proceeds to a process of Step S15.

On the other hand, if deleting training data is instructed (Step S12; DELETE), the training data selected in Step S11 is deleted from the registration table 181 (Step S14), and the operation proceeds to the process of Step S15. At this time, information of the training data which was instructed to be deleted is deleted from the registration table 181, but the training data itself remains being stored in the training data DB 18.

In Step S15, information such as data on which changing or deleting is done, whether there is changing or deleting, changing content and the like is stored in the changing history table 182 as changing history information. If, later on, the changed training data is instructed to be returned to the category before the changing or resetting to an initial state is instructed, it is possible to restore the registration state of training data to a state before the changing or deleting, based on this changing history information. Next, based on a training data group after changing or deleting is done, the CPU 11 corrects a judgment parameter to be used in a judging logic for the second detection of an abnormal shadow candidate (Step S16). Its correcting method is approximately the same as the correcting method described regarding Step S7 of the registration process in FIG. 9, its description is omitted here. When the correction is completed, the present process is completed.

Next, with reference to FIG. 13, the training data providing process which manages training data uploaded to the server 50 from each medical image processing apparatus 10 and provides training data to each medical image processing apparatus 10. FIG. 13 is a flowchart illustrating the training data providing process performed by the medical image processing apparatus 10 and the server 50.

In the training data providing process shown in FIG. 13, first, request information for giving a request to register training data registered in the training data DB 18 of the medical image processing apparatus 10 to the training data DB 53 of the server 50 is generated, and the request information is transmitted to the server 50 along with training data to be registered, feature data and registration information regarding the training data (Step S101). When the server 50 receives the registration request information of training data along with the training data, the feature data and the registration information from any one of the medical image processing apparatuses 10 on the communication network N, DB registration is performed by storing the received training data and the received feature data in the training data DB 53 in the server 50, and by storing the registration information regarding the training data in the registration table 541 based on the received registration information (Step S102).

In this way, training data registered by each medical image processing apparatus 10 is stored in the training data DB 54 in the server 50 and integrally managed in the server 50. Then, in the server 50, a web page for providing training data to each medical image processing apparatus 10 is managed, so that it is possible to obtain training data managed in the server 50 through the web page by operating the medical image processing apparatus 10, in the case that a user needs to obtain training data registered by another user, a user needs to obtain the same training data again as the registered training data in the medical image processing apparatus 10 which the user operates was lost, or the like.

When the medical image processing apparatus 10 is instructed through the operating unit 12 by a user to do the access to the web page which provides training data, the web page is obtained from the server 50 and displayed on the displaying unit 13. Here, it is assumed that a login identification is performed and a user is identified when the web page is obtained. Then, when downloading training data which is registered in the training data DB 54 in the server 50 is instructed on the web page, request information for requesting the downloading the training data is generated and transmitted to the server 50 (Step S103).

When the server 50 receives the request information for downloading the training data, list information of downloadable training data is generated and transmitted to the medical image processing apparatus 10 (Step S104). In the medical image processing apparatus 10, based on received list information of training data from the server 50, training data to be downloaded is selectively displayed on the displaying unit 13.

For example, thumbnail images of the training data may be displayed as a list, or file names of the training data may be firstly displayed as a list and secondly images of selected training data among them may be displayed.

Next, training data to be downloaded is selected in the medical image processing apparatus 10, and when downloading the training data is instructed, request information for requesting the downloading is generated and transmitted to the server 50 (step S105).

When the server 50 receives the request information of the downloading from the medical image processing apparatus 10, the selected training data and its feature data are obtained from the training data DB 54 and transmitted to the medical image processing apparatus 10 (Step S106). Then, money amount corresponding to the count of downloaded training data is written in the charging table 531 so as to relate the money amount with a user who has done the downloading, for charging (Step S107).

Here, in the present embodiment, the charging is done according to the count of downloaded training data. However, the charging may be done according to the data amount of downloaded training data. After all, a charging method is not in particular limited.

On the other hand, in the medical image processing apparatus 10, DB registration is performed by storing training data and feature data transmitted (downloaded) from the server 50 in the training data DB 18 in the medical image processing apparatus 10, and by writing its registration information in the registration table 181 (Step S108). Then, in the medical image processing apparatus 10, based on a training data group which is existing training data with newly-registered training data in the training data DB 18, a judgment parameter to be used in a judging logic for detecting an abnormal shadow candidate is corrected (Step S109), and the present process is completed.

As above, according to the present embodiment, a designated image area is stored and newly registered in the training data DB 18 as training data, stored training data in the training data DB 18 is changed or deleted according to an instruction, and a judgment parameter to be used in a judging logic is corrected based on a training data group after the training data is newly registered, changed or deleted. Therefore, it is possible for a user to add, change and delete training data freely, and therefore to customize a detecting condition of an abnormal shadow candidate.

For example, by creating a DB of training data for each doctor, it is possible to concentrate cases which a doctor is not good at dealing with, whereby it is possible to realize a detection of an abnormal shadow candidate according to the doctor.

Further, when an image area to be registered as training data is designated, an image area within a contour extracted by the dynamic contour extraction method from a range around a certain point selected by a user is automatically designated. Therefore, it is possible for a user to newly register training data with an easy operation.

Further, when training data is stored, the training data is classified to a category selected by a user to be stored. Therefore, it is possible for a user to do the adjustment of whether to detect or not to detect an abnormal shadow candidate according to an interpretation style of the user's own, whereby user-friendliness is improved.

Further, when training data is changed or deleted, its history information is stored in the changing history table 182. Therefore, in the case that, after a category of training data is changed, there is a necessity of returning the category to the one before the changing due to the decrease of detection accuracy, or the like, it is possible to reset the category before the changing based on the changing history information stored in the changing history table 182.

Further, training data registered in DB at each medical image processing apparatus 10 is uploaded to the server 50 for integrally managing training data in the server 50, and training data is downloaded to the medical image processing apparatus 10 according to a request from each medical image processing apparatus 10. Therefore, it is possible for a user to obtain training data or the like which is DB-registered by another user, and also possible to increase detection accuracy by increasing training data of a desired case.

Further, in the server 50, charging money amount is calculated according to the count of downloaded training data, and the charging money amount is stored in the charging table 531 so as to relate the charging money amount with user information. Therefore, it is possible to do the charging management to users.

Here, described contents in the present embodiment is a suitable example of the medical image processing system 100 and the medical image processing apparatus 10 to which the present invention is applied, and the present invention is not limited to the contents.

For example, in the above, described is the example that it is possible to add, change and delete training data with respect to each user. However, it is also possible to do the DB registration with respect to each certain group, such as each diagnosis department, each hospital and the like. Thereby, it is possible to unify a detecting condition of an abnormal shadow candidate at each group. For example, as image quality of a medical image changes depending on apparatus characteristic of a medical image generating apparatus, by creating a DB of training data with respect to each medical image generating apparatus, it is possible to detect an abnormal shadow candidate optimally according to its apparatus characteristic.

Further, information of a detection result of an abnormal shadow candidate stored in the ROM 15 of the medical image processing apparatus 10 may be stored in the ROM 53 of the server 50 so as to relate the information with information of training data used for the detection. In other words, the detection result storing section may be realized by the server 50.

And so forth, the detailed structure and the detailed operation of the medical image processing system 100 and the medical image processing apparatus 10 in the present embodiment may be suitably changed without departing the gist of the present invention.

The entire disclosure of a Japanese Patent Application No. Tokugan 2003-431249 filed on Dec. 25, 2003, including specifications, claims, drawings and summaries are incorporated herein by reference in their entirety.

What is claimed is:

1. A medical image processing apparatus comprising:
    an abnormal shadow candidate detecting section for detecting an abnormal shadow candidate from a medical image in which an image of a subject is generated, by using a judging logic which performs judgment by using training data;
    a training data storing section for storing the training data which is used at a detection of the abnormal shadow candidate, so as to make the stored training data updatable;
    a displaying section for displaying the medical image and a detection result of the abnormal shadow candidate;
    an area designating section for designating an area to be registered as the training data on the medical image displayed on the displaying section;

a data controlling section for having an image of the designated area stored in the training data storing section as the training data so as to classify the training data into a plurality of categories;

a changing section for changing a category into which the training data is classified in the training data storing section; and a logic correcting section for correcting the judging logic of the abnormal shadow candidate detecting section based on the training data stored in the training data storing section after the category is changed by the changing section.

2. The apparatus of claim 1, further comprising a history storing section for storing changing history information as to when the category is changed by the changing section, wherein, after the category of the training data is changed, when the changing section is instructed to change the category of the training data back to a previous category, the changing section changes the category of the training data to the previous category based on the changing history information stored in the history storing section.

3. The apparatus of claim 2, further comprising a deleting section for deleting a portion of the training data stored in the training data storing section, wherein the history storing section stores deleting history information as to when the deleting section deletes the training data, and after the training data is deleted, when canceling of deletion of the training data is instructed, the changing section returns the deleted training data in a former storing state based on the deleting history information stored in the history storing section.

4. The apparatus of claim 3, wherein, when the deleting section deletes the training data, the logic correcting section corrects the judging logic based on the training data excluding the deleted training data.

5. The apparatus of claim 1, wherein the area designating section designates the area on the medical image displayed on the displaying section, based on a point selected by a user.

6. The apparatus of claim 5, wherein the area designating section designates the area to be within a contour from a range around the point selected by the user, and wherein the contour is extracted by a dynamic contour extraction method.

7. The apparatus of claim 1, further comprising a communicating section for communicating with a server which comprises a training data storing section for storing the training data used by a plurality of medical image processing apparatuses, so as to make the stored training data updatable, wherein the data controlling section controls the communicating section to transmit the training data stored in the training data storing section of the medical image processing apparatus to the server to be stored in the training data storing section of the server.

8. The apparatus of claim 7, wherein the data controlling section controls the communicating section to transmit to the server request information for requesting and obtaining the training data stored in the training data storing section of the server, and wherein the data controlling section controls the obtained training data to be stored in the training data storing section of the medical image processing apparatus.

9. The apparatus of claim 8, wherein the displaying section selectively displays the training data stored in the training data storing section of the server when the training data is obtained from the server.

10. The apparatus of claim 1, further comprising a detection result storing section for storing information of the detection result of the abnormal shadow candidate so as to relate the detection result information with information of the training data used in the detection.

11. A medical image processing system comprising:

a medical image processing apparatus; and a server connected by to the medical image processing apparatus, wherein the medical image processing apparatus comprises:

an abnormal shadow candidate detecting section for detecting an abnormal shadow candidate from a medical image in which an image of a subject is generated, by using a judging logic which performs judgment by using training data;

a training data storing section for storing the training data which is used at a detection of the abnormal shadow candidate, so as to make the stored training data updatable;

a displaying section for displaying the medical image and a detection result of the abnormal shadow candidate;

an area designating section for designating an area to be registered as the training data on the medical image displayed on the displaying section;

a data controlling section for having an image of the designated area stored in the training data storing section of the medical image processing apparatus and stored in a training data storing section of the server as the training data so as to classify the training data into a plurality of categories;

a changing section for changing a category into which the training data is classified in the training data storing section of the medical image processing apparatus; and a logic correcting section for correcting the judging logic of the abnormal shadow candidate detecting section based on the training data stored in the training data storing section of the medical image processing apparatus after the category is changed by the changing section, and wherein the server comprises the training data storing section for storing the training data which is used by the medical image processing apparatus so as to make the stored training data updatable.

12. The system of claim 11, wherein the server comprises a providing section for providing the training data stored in the training data storing section of the server to the medical image processing apparatus, according to a request from the medical image processing apparatus, and wherein the data controlling section of the medical image processing apparatus transmits to the server request information for requesting and obtaining the training data stored in the training data storing section of the server, and wherein the data controlling section controls the obtained training data to be stored in the training data storing section of the medical image processing apparatus.

13. The system of claim 12, wherein the data controlling section of the medical image processing apparatus transmits user information of a user who has requested the training data with the request information of the training data to the server for obtaining the training data from the server, and wherein the server comprises a charging section for charging each user that has requested the training data, according to a count of the training data provided by the providing section.

14. The system of claim 11, further comprising a detection result storing section for storing information of the detection result of the abnormal shadow candidate by the abnormal shadow candidate detecting section so as to relate the detection result information with information of the training data used in the detection.

15. A medical image processing apparatus comprising:
an abnormal shadow candidate detecting section for detecting an abnormal shadow candidate from a medical image in which an image of a subject is generated, by using a judging logic which performs judgment by using training data;

a training data storing section for storing the training data which is used at a detection of the abnormal shadow candidate, so as to make the stored training data updatable;

a displaying section for displaying the medical image and a detection result of the abnormal shadow candidate;

an area designating section for designating an area to be registered as the training data on the medical image displayed on the displaying section, wherein the designated area is within a contour from a range around a point selected by a user, and wherein the contour is extracted by a dynamic contour extraction method;

a data controlling section for having an image of the designated area stored in the training data storing section as the training data;

a logic correcting section for correcting the judging logic of the abnormal shadow candidate detecting section, based on the training data stored in the training data storing section.

\* \* \* \* \*